Patented Apr. 6, 1948

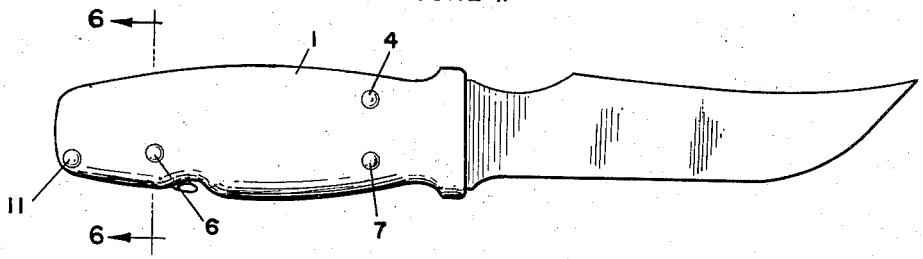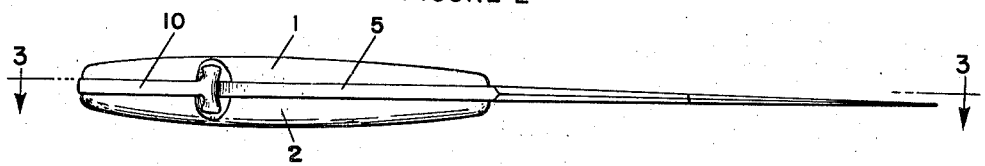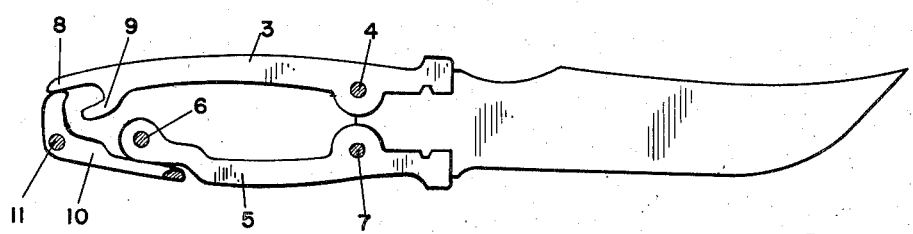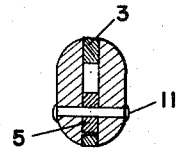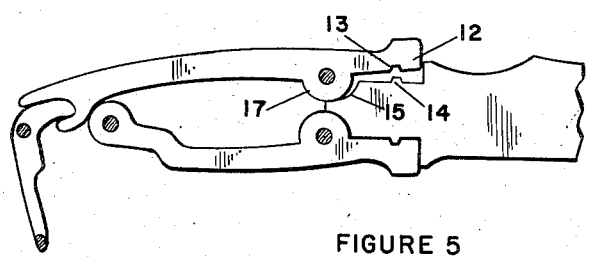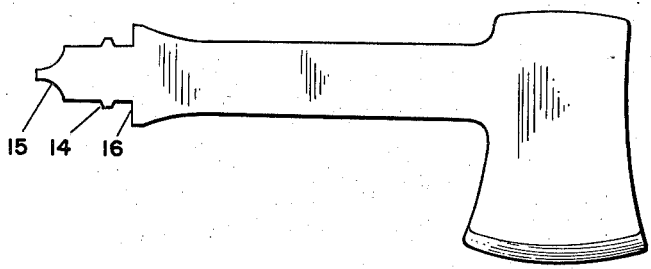

2,439,071

UNITED STATES PATENT OFFICE 2,439,071

DETACHABLE HANDLE FOR KNIVES, HATCHETS, ETC.

Lawrence H. Basham, Alderson, W. Va.

Application April 11, 1946, Serial No. 661,309

2 Claims. (Cl. 279—77)

This invention relates to tools and the like, and more particularly to improvements in detachable handles for knives, hatchets, etc.

It is an object of the invention to provide an inexpensive, durable and efficient handle for alternately receiving and retaining a different number of blades, such as knife blades, screw drivers, hatchets, and the like.

A further object is to provide means whereby blades can be quickly inserted into the handle or removed therefrom.

A further object is to provide means for firmly and tightly gripping a blade when inserted into the handle, and means for quickly releasing the grip on a blade.

These and other objects are attained by the novel construction and arrangement of parts hereinafter described and illustrated by the accompanying drawings, forming a part hereof, and in which:

Fig. 1 is an elevational view of a handle and blade in accordance with the invention.

Fig. 2 is a bottom plan view of the handle and blade.

Fig. 3 is a sectional view taken on line 3—3 of Fig. 2.

Fig. 4 is an elevational view showing details of the handle.

Fig. 5 is a view showing the arrangement of a hatchet for use with the handle.

Fig. 6 is a sectional view taken on line 6—6 of Fig. 1.

Referring to the drawings, the handle is shown to comprise two side plates, 1 and 2, and pivotally connected to the plates by a pin 4 is a spring 3 of the usual jackknife type. Also connected to the plates is a bar 5, which is firmly held in position by rivets 6 and 7.

Spring 3 has a portion 8 and a lip 9 adapted to be engaged by an arm of a lever 10 pivoted at 11 to the side plates. The spring 3 and the bar 5 have blade receiving ends 12 provided with notches 13 adapted to receive protuberances 14 on opposite sides of a blade (see Fig. 5), each blade being provided with a pair of cusps 15 at the end thereof to receive rounded portions 17 of the spring 3 and bar 5. Also, the blades are provided with shoulders 16, the ends 12 of the spring 3 and bar 5 resting in the spaces between the protuberances 14 and the shoulders.

In operation, a blade is inserted into the handle and the lever 10 is moved to the position shown in Fig. 3 with an arm of the lever bearing against the portion 8 of spring 3. This counteracts the inward movement of spring 3 and produces a vise like grip on the blade. To remove a blade, the lever 10 is moved to the position shown in Fig. 4 with the arm of the lever 10 bearing downward on the lip 9, to move the spring 3 inward and raise the end 12 and notch 13 from the protuberances 14.

From the above description it will be seen that there has been provided a simple and effective handle for holding various blades firmly and tightly.

The above description is to be considered as illustrative and not limitative of the invention, of which modifications can be made without departing from the spirit and scope set forth in the appended claims.

The invention having been described, what is claimed is:

1. In a removable handle for blades, a pivotally mounted spring, a fixed bar, means at the ends of the spring and bar adapted to engage an end of a blade, a pivotally mounted lever adapted to engage one portion of the spring to move the spring to a position to tightly grip a blade, and a lip on the spring engageable by the lever to move the spring to a position to release a blade.

2. In a removable handle for blades, a pivotally mounted spring, a fixed bar, means at the ends of the spring and bar adapted to engage an end of a blade, and a pivotally mounted lever adapted to engage a portion of the spring to move the spring to a position to tightly grip a blade.

LAWRENCE H. BASHAM.

REFERENCES CITED

The following references are of record in the file of this patent:

UNITED STATES PATENTS

| Number | Name | Date |
|--------|------|------|
| 800,610 | Croasdale | Sept. 26, 1905 |
| 1,205,760 | Ligon | Nov. 21, 1916 |
| 1,361,021 | Copeman | Dec. 7, 1920 |